United States Patent [19]

McMahon

[11] Patent Number: 5,119,454
[45] Date of Patent: Jun. 2, 1992

[54] BULK OPTIC WAVELENGTH DIVISION MULTIPLEXER

[75] Inventor: Donald H. McMahon, Carlisle, Mass.

[73] Assignee: Polaroid Corporation, Cambridge, Mass.

[21] Appl. No.: 197,590

[22] Filed: May 23, 1988

[51] Int. Cl.⁵ ............................................. G02B 6/30
[52] U.S. Cl. ..................................... 385/49; 359/629; 359/634; 359/290
[58] Field of Search ............. 350/96.10, 96.11, 96.12, 350/96.13, 96.14, 96.15, 96.16, 162.22, 162.23, 171, 355, 356, 358; 370/1-4

[56] References Cited

U.S. PATENT DOCUMENTS

| 4,397,525 | 8/1983 | Ahlen | 350/162.17 |
|---|---|---|---|
| 4,588,296 | 5/1985 | Cahill et al. | 356/350 |
| 4,693,544 | 9/1987 | Yamasaki et al. | 350/96.16 |
| 4,800,557 | 1/1989 | Weber | 370/3 |
| 4,871,235 | 10/1989 | Greene et al. | 350/354 |

*Primary Examiner*—Frank Gonzalez
*Attorney, Agent, or Firm*—Francis J. Caufield

[57] ABSTRACT

An optical multiplexing/demultiplexing device combines an etalon and weak diffraction grating along with temperature control to finely tune local resonant stations along the etalon to separate and/or combine a plurality of optical signals that are finely spaced in wavelength.

22 Claims, 3 Drawing Sheets

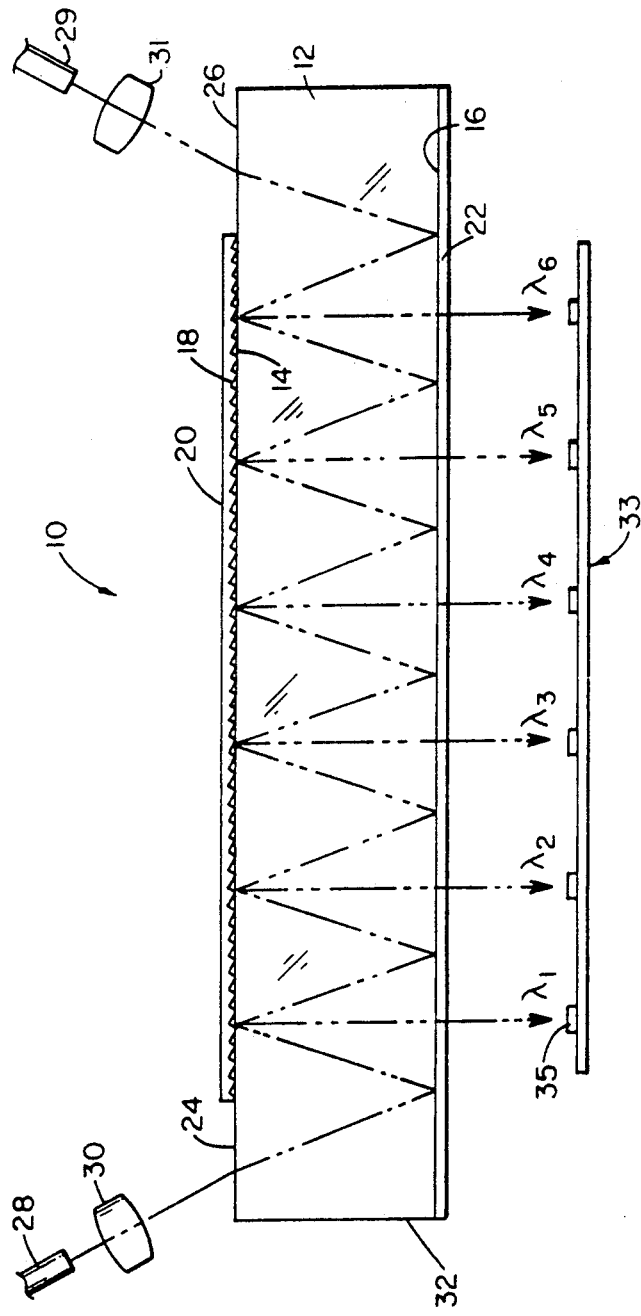
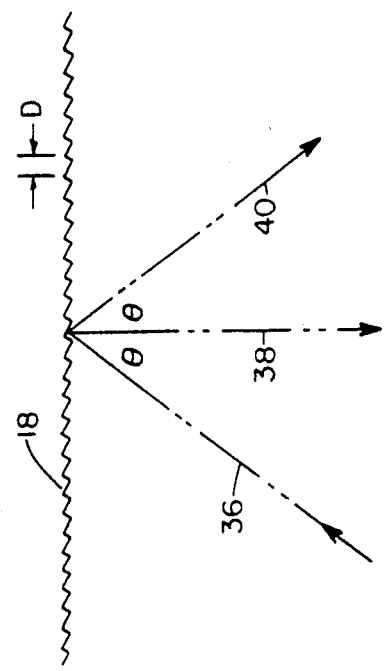
FIG 1
FIG 2

BULK OPTIC WAVELENGTH DIVISION MULTIPLEXER

FIELD OF THE INVENTION

This invention in general relates to the field of optical communications and in particular to wavelength division multiplexing devices for use in optical communications systems.

BACKGROUND OF THE INVENTION

Although both grating and interference filters have been used as optical filters for wavelength division multiplexing, neither provides for sufficiently high wavelength selectivity to effectively make use of the potential optical communication capacity inherent in the available optical bandwidth of fibers. For example, it is possible with relative ease to modulate present semiconductor laser diodes at frequencies up to 1 GHz. Since higher modulation rates entail excess cost penalties the modulation rate of 1 GHz may be adopted as typical of what will be used for a broad range of communication purposes in the near future. With this channel bandwidth, separating adjacent optical channels by a frequency difference much greater than this value is tantamount to wasting optical communication capacity. Yet 1 GHz at one micron wavelength represents a wavelength difference of one 0.003 nm.

Consider a diffraction grating having $1/D = 5000$ lines/cm. At one micron the first order diffraction angle is given by $$D n \sin \Theta = \lambda \Theta = \sin^{-1}(\tfrac{1}{3}) = 0.339 \text{ radians.}$$

Assume further that a compact bulk optic device has dimensions of the order of 1 cm. Then the resolution in angle of the grating is given by, with $w$, the width of light beam, $= 1$ cm.

$$\delta \Theta \approx \frac{\lambda}{nw} = \frac{D}{w} \Theta = .2 \times 10^{-3} \text{ radians}$$

Therefore, the angular resolution of the grating is one part in 5000 or 0.2 nm, i.e., about 100 times larger than is desired for close packed wavelength division multiplexing. Clearly, a grating of sufficient resolution must be 33 cm in size and hence bulky and prohibitively costly.

The best interference filters have resolutions of approximately 1 nm or about 300 times coarser than desired.

There are a very limited number of optical structures which provide the necessary selectivity. The Michelson echalon grating, the Lummer Gehrke plate and the Fabry-Perot etalon are well-known examples. Of these, the Fabry-Perot is unique in that its effective physical length is multiplied by the "finesse" of the etalon. That is the length over which interference is active is equal to the number of round trip distances the light beam bounces back and forth within the etalon before leaking away or being absorbed. The Fabry-Perot etalon is therefore a compact device having extraordinarily high resolution.

Fabry-Perot resonators exhibit many resonances separated in frequency by the amount $f$ where, $$f = \frac{c}{nL}$$

denoted as the "free spectral range", where $L$ is the round trip distance in the resonator, $n$ is the index of refraction and $c$ is the velocity of light in vacuum. The half height, full bandpass of the resonator is defined to be equal to the free spectral range divided by the finesse. For example, a 1 cm thick etalon made of glass having an index of 1.5 has a free spectral range of 10 GHz. If the resonator finesse is made to be equal to 100 then the filter bandpass is equal to 100 MHz. The finesse of the etalon is controlled or determined by the reflectivity of the surface mirrors, the absorption of the internal etalon medium, diffraction losses, and lack of perfect parallelism of the opposing mirror surfaces. With care, parallel plate glass etalons may be manufactured having finesses of up to at least 100.

By virtue of its high finesse, the Fabry-Perot, unlike the Michelson or Mach Zehnder interferometers, allows one to distinguish between a number of different wavelengths bands equal to the value of the finesse of the etalon. For example, if the Fabry-Perot finesse is 100, then in principle one can distinguish between any one of 100 adjacent wavelength bands. However, for use as a filter, one must separate adjacent channels by 3-5 times the bandpass to achieve acceptable crosstalk levels.

However, wavelengths separated by an integer number of the free spectral ranges of the etalon can not be distinguished or separated from one another by a (single) Fabry-Perot etalon. The presence of multiple resonances in effect limits the communication capacity of a single Fabry-Perot etalon to a single free spectral range because of this inability to discriminate modular the free spectral range. While at first sight this appears to be a disadvantage to the approach of using a Fabry-Perot etalon or the similar behaving ring resonators as filters, the ambiguity may be resolved by using, for example, more than one Fabry-Perot resonator in tandem, creating the effect of a much increased free spectral range. With multiple resonators working in vernier fashion the free spectral range is multiplied by the finesse of each additional resonator used for filtering. Thus, for example, if two resonators are used each having a finesse of 100 and a free spectral range of 10 and 10.1 GHz respectively, then the total effective free spectral range is increased from 10 GHz to 1000 GHz. In this case the overlap of resonances from each filter occurs only after 99 or 100 free spectral ranges of the two component filters.

Conversely, the multiple resonances of Fabry-Perot resonators have the benefit not only of vernier tuning but (1) allowing the use of laser operating with frequency differences separated by many free spectral ranges (that is, the need to match laser frequencies is greatly alleviated for single resonator filter systems), and (2) the presence of multiple resonances allows one to transfer the frequency stability of a highly stable source to the etalon and thence electronically stabilize a laser to any coexisting etalon resonance.

Since a simple Fabry-Perot etalon having a finesse of 100 can selectively pass one wavelength band to the exclusion of the remaining 99 wavelength bands, such an etalon can be used as a multiplexer/demultiplexer to efficiently separate or combine many wavelengths of light. One approach for multiplexing is to successively pass a light beam by 100 Fabry-Perot etalons using each etalon to separate a distinct one of the 100 distinguishable wavelengths from the rest. Such a procedure is made difficult by the requirement that the light strike each etalon at substantially normal incidence. Clearly the manufacture and use of 100 separate etalons for multiplexing and demultiplexing is cumbersome and costly both in terms of manufacturing etalons and the necessary optics and the associated electronics required to stabilize the wavelength of the etalon filters in the presence of changing ambient conditions such as temperature.

What is needed is a relatively compact, rugged, and easily manufacturable device that provides a resolution of the order of 1 GHz and a free spectral range of 100 GHz, allowing approximately 100 channels to be multiplexed and demultiplexed. Specifically, what is implied for demultiplexing is that all wavelengths enter via a common single mode fiber and different wavelengths exit in a spatially separated format so that the separated wavelength components can be separately detected, sent to separate fibers or otherwise separately processed. Moreover, what is needed is a controlled method of separation such that spatial separation is linearly proportional to wavelength separation. However, unlike the diffraction grating a much higher resolution is required for close packed wavelength division multiplexing. It should be appreciated that, due to channel crosstalk considerations, the number of useful channels is approximately equal to the finesse divided by 3 to 5.

It is therefore a primary object of the present invention to provide a wavelength division multiplexing device that satisfies these several requirements.

SUMMARY OF THE INVENTION

This invention relates to a bulk optic multiplexing-/demultiplexing device that has the ability to separate and combine a plurality of optical signals that are finely spaced in wavelength and, as such, is suitable for use in a variety of applications in optical communications systems, sensing, and displays.

In preferred embodiments, the device comprises an etalon structure comprising a piece of glass that may be in the form of a rectangular parallelepiped having two opposed lengthwise surfaces polished and coated to that they are substantially parallel and highly reflecting—one substantially 100% and slightly transparent. On the surface with the more highly reflective mirror there is placed a weak diffraction grating and the length of the grating and its corresponding mirror are shorter than the surface while the other partially reflective surface is slightly longer to provide two clear sections for coupling at opposite ends of the etalon.

Optical signals are coupled into the parallelepiped near one end as a collimated beam directed obliquely into a section of the partially reflecting surface at a predetermined angle of incidence so the the beam strikes the grating at the same predetermined angle of incidence a number of times as it propagates along the length of the etalon with minimal loss. The weak grating is arranged to diffract a small portion of the signal beam within a predetermined band of wavelengths perpendicular to the reflecting surfaces wherever the beam strikes it along the length of the etalon to provide a set of equally spaced local resonator stations that can be fine tuned in wavelength as indicated below so that at each resonator station one selected wavelength can be separated out from the initial wavelength band diffracted by the grating. The individual signals emerge from the device at their corresponding resonator location by transmitting through the partially reflecting surface.

The individual local resonators are tuned by controlling the local optical path length between the reflecting surfaces either by incorporating a slight wedge shape to the etalons by changing the physical length of the bulk glass through heating or stress or its index of refraction with electric fields in embodiments where the medium has electro-optic properties or any other such mechanism.

Remaining signals are coupled out of the etalon by way of a waveguide and focusing lens that accepts collimated signals and directs them into the end of the waveguide.

BRIEF DESCRIPTION OF THE DRAWINGS

The novel features that are considered characteristic of the invention are set forth with particularity in the appended claims. The invention itself, however, both as to its organization, method of operation, and fabrication, together with other objects and advantages thereof, will best be understood from the following detailed description of the illustrated embodiments when read in connection with the accompanying drawings wherein like numbers have been employed in the different figures to denote the same parts and wherein:

FIG. 1 is a schematic top view of the of one embodiment of the invention;

FIG. 2 is a schematic that explicitly shows the relationship between oblique incident radiation and an etalon surface of the invention along with grating periodicity;

DETAILED DESCRIPTION

Figure 3:
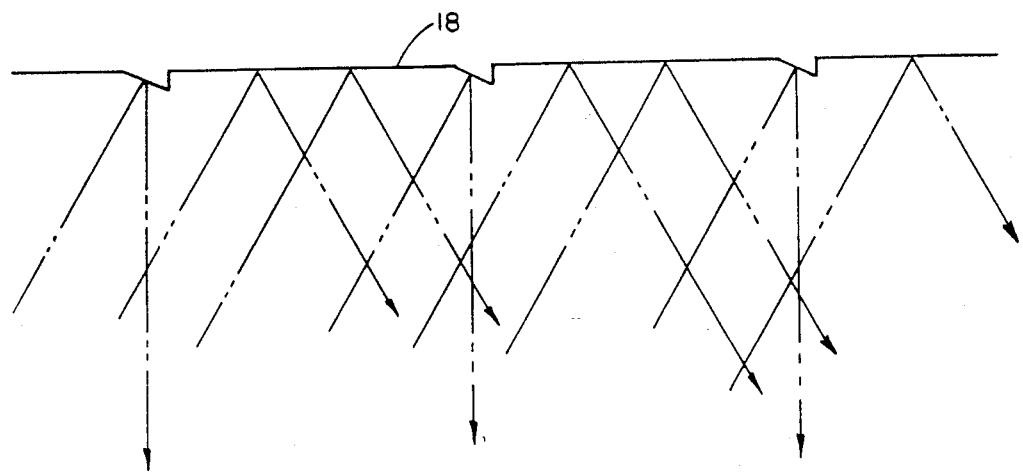
FIG. 3 is a schematic illustrating the use of a blazed grating for use in the invention.

Referring now to FIG. 1, there is shown at 10 a multiplexing/demultiplexing device embodying the features of the present invention. Device 10 comprises an etalon 12 that is make of a blank of high quality, low loss glass, such as fused silica or BK7, that is ground and polished so that its opposite faces, 14 and 16, are optically flat and mutually parallel. Flatness of a 20th of one wavelength of light and parallelism or controlled lack of parallelism by a small fraction of a fringe over the entire active surface of etalon 12 is required. These requirements are similar to the requirements for producing high quality, high finesse etalons and are achievable with present state of the art fabrication procedures. A weak diffraction grating 18 is manufactured on one side of etalon 12 so as to cause approximately one percent of the incident light is diffracted into the one desired first order of diffraction, the remaining light being speculatory reflected. Finally, highly reflective coatings, 20 and 22, are applied to both sides of etalon 12 except at end sections, 24 and 26, where light is to enter or exit the body of etalon 12.

In normal use, light from an input fiber 21 is directed by a collimating lens 30 onto entrance section 24 and enters etalon 12 at nonnormal incidence so that the light beam successively bounces back and forth between opposite reflecting surfaces of etalon 12 as well as advancing along it in a preselected direction. The angle of incidence of the light beam and the grating spacing are mutually selected so that a small portion (of the order of one percent as stipulated above) of the obliquely incident beam is diffracted to propagate perpendicularly to the surfaces of the etalon. Now, since both etalon surfaces are close to perfectly reflecting and the glass is non absorbing, the diffracted light is trapped by etalon 12 and can only escape via a subsequent weak diffraction process or via the slightly transparent mirrors. Thus, any light so 25 trapped bounces back and forth in etalon 12 about 100 times before escaping.

The above light trapped in etalon 12 can interfere constructively or destructively with later arriving portions of the obliquely incident light beam diffracted so as to be trapped in etalon 12. Destructive interference between incident and trapped light causes the electric field build up in etalon 12 to be relatively small, about 0.01% of the incident light beam power (i.e., circulating power is down by roughly 1/finesse). However, if constructive interference occurs between the light circulating within etalon 12 and the incident light beam which "pumps" it via diffraction grating 18, then the power level in etalon 12 is 100 times larger (larger by the ratio of the finesse) than the incident light power level. Under such circumstances where the round trip optical path is an integer number of wavelengths of light, the etalon "resonates" with the incident light wavelength and extracts a significant fraction of light power from the incident beam thereby inhibiting the undiffracted passage of light past the resonating etalon. If no other light losses are present except light diffraction, then diffraction will act to remove a fraction of light from the forward propating beam and diffract light into the backward propagating direction. A more useful situation occurs, however, when one surface of etalon 12 is slightly transparent, since then the high electric field circulating within the resonant structure allows a significant fraction of light to exit via the slightly transparent mirror. It is this portion of light exiting etalon 12 via the slightly transparent mirror that comprises the useful output since relatively little light will exit via this surface unless etalon 12 resonates.

As is readily apparent, the FIG. 1 structure contains many equivalent locations where light may be diffracted so as to be trapped via localized etalons, and these correspond to the locations having the broken arrows emerging from surface 16. In order for wavelength multiplexing/demultiplexing to occur, each successive etalon is made to resonate at a different wavelength. If, for example, the localized etalons have a finesse of 100, each successive etalon must have a wavelength difference of at least 1/100 of a wavelength of light as measured in the glass. For all practical purposes, the thickness of etalon 12 is to be constant just as in a normal etalon, except for a systematic change which is accurately produced and controlled. Such small differences may be created by simple polishing procedures but can also readily be produced via imposing a temperature gradient to systematically control localized temperature. To first order, the opposite ends, 32 and 34, of the multiple etalon structure are held at different controlled temperatures such that a linear temperature gradient results and a small linear path difference is created between adjacent localized etalons. To provide more accuracy, localized sections of the etalon structure can be individually temperature controlled to provide a more linear controlled path difference even if linearity were not present in the original structure held at a single common temperature value, or heating electrodes can be made nonlinear to correct for nonlinear temperature gradients. In the case of temperature control, the temperature range can be adjusted to be a full free spectral range across the multiplexer or a fraction of a free spectral range. In the former case a single reference frequency or two reference frequencies can be used to control the temperatures present at the first and last localized resonators of the multiplexer so that intermediate resonators cover, without additional stabilization electronics, the remaining intermediate channel frequencies.

In addition to temperature control, stress may also be used as a means for controlling the optical path length at the localized etalon stations.

An array of photodetectors 33 including individual cells typified by 35 can be placed on or opposite the output face of device 10 as shown in FIG. 1 for purposes of converting the separated light signals into electrical form.

Device 10 has a number of expected uses. First of all, it can be readily used for long haul transmission since a single device multiplies through WDM by more than an order of magnitude the overall capacity of a link. Secondly, the device can be made to be substantially polarization insensitive, an attribute not necessarily held by either fiber optic resonators or integrated optic resonators. Thirdly, by incorporating many resonators into a single device, separate wavelength control of each resonator is not required. Thus, the electronic complexity is greatly reduced. Fourth, as mentioned above, the structure is simple, rugged and readily manufactured. Finally, the incorporation of many resonators into a single device makes more practical the use of such a device as a multiple local drop. That is, throughput coupling loss for the input/output or bus beam which may ordinarily be as high as perhaps 2 dB per drop, is effectively associated with many local drops—hence the loss per drop may be quite low—less than 0.2 dB for a ten resonator structure. It may indeed prove impossible to create either fiber or integrated optic resonators with as low a drop loss as may be created by this multiple resonator bulk optic device.

The bus resonators can, of course, be tuned to different bandpasses by changing the characteristics of the diffraction grating 18 or by using several sections in tandem each with its own grating spacing. The grating resolution is of the order of 1 nm for a 1 mm diameter input beam. Thus, the throughput loss of a multiplexer/demultiplexer will be relatively low unless the wavelength (or oblique angle of incidence) is proper to diffract a reasonable fraction of light into a direction perpendicular to the etalon surfaces. The diffraction loss to the input beam will be of the order of 1% per diffraction grating reflection if the associated etalon is not resonating.

Assuming a single channel of the multiplexer/demultiplexer is allocated to one subscriber, this subscriber can use different etalon orders for different purposes. In this case, the subscriber has a second demultiplexer/multiplexer device similar to the bus multiplexer/demultiplexer that is operated to provide coarse filtering action such that differing orders of the bus demultiplexer are separated by the subscriber's local demultiplexer.

Suitable diffraction gratings may be constructed on the etalon surface either by ruling machines or by photolithography. Either procedure provides techniques whereby the ruling may be "blazed" so as to preferentially diffract light between selected desired directions thereby wasting less light diffracted into unwanted orders. The highly reflecting surfaces of etalon 12 can be created via multilayer dielectric coatings or via metalization. While silver reflects about 99% of 0.8 microns and so could easily be used to produce a at least one mirror of a resonator with a finesse of 100, highly reflective metallic mirrors exhibit high loss in transmission. Dielectric coatings are preferred at least for partially transparent mirrors to maximize transmission for a give level of reflectivity. Also if dielectric coatings are used, it would be desirable to create 100% reflectivity at the oblique angle of incidence of the exciting beam while creating a slightly transparent coating (reflectivity of say 98.5%) for light propagating perpendicular to etalon 12 so as to more readily allow for some light to escape to be used.

FIG. 2 shows explicitly the relationship between the oblique incident direction of the multiplexed light beam, designated at 36, relative to the etalon surface and the spacing periodicity of the diffraction grating 18. Here also are shown the diffracted beam and the speculatory reflected beam which are designated at 38 and 40, respectively. For a given grating periodicity distance, D, the angle of incidence, $\Theta$, must be set so that $\sin \Theta = \lambda/nD$ in order to diffract light perpendicular to the surface. A weak diffraction grating is created via a photolithographic masking procedure on photo resist and then etching the glass with a weak solution of HF through developed photoresist, then removing photoresist.

FIG. 3 shows how the surface of grating 18 would appear if blazed by standard ruling procedures.

FIGS. 4 and 5a-c show equivalent multiplexer/demultiplexer structures using electro optic media rather than glass. In these embodiments, individual resonator tuning may be achieved electrically rather than by thermal control. In addition electrical signals can now be applied to the resonator to modulate a cw carrier frequency present on the multiplexed beam.

Figure 4:
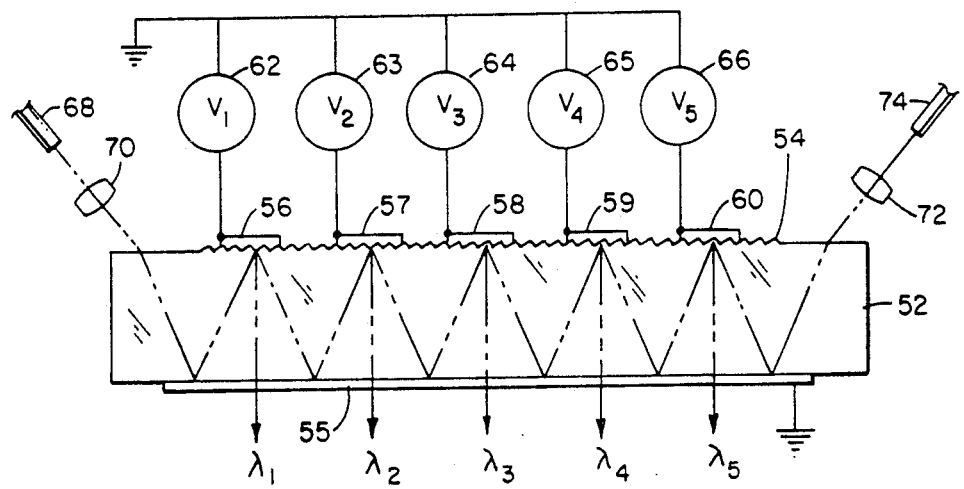
FIG. 4 is a schematic top view of another embodiment of the invention.

FIG. 4 illustrates a resonator device 50 fabricated from a crystal 52 such as ADP or KDP (ammonium and potassium dihydrogen phosphate respectively) with the "c" or optic axis pointing downwardly in the plane of the paper. The diffraction grating here is shown at 54, and opposite it is a 99% reflecting, electrically conducting mirror 55 as, for example, created by sputtering indium tin oxide on top or a dielectric reflector. Corresponding to each localized etalon station along the crystal 52 are 100% reflective conductive electrodes 56-60, and associated with each electrode, 56-60, are tuning and signal voltage sources, 62-66. As before, an input fiber 68 is directed into an end section of crystal 52 by a collimating lens 70, and a focusing lens 72 directs the remaining signal into an output bus fiber 74 for further downstream use. With the arrangement of device 50, the electric field is applied in the trapped light beam direction. In this case, since the light paths of the etalons lie along the c-axis, both polarization states resonate at the same wavelength.

Figure 5A:
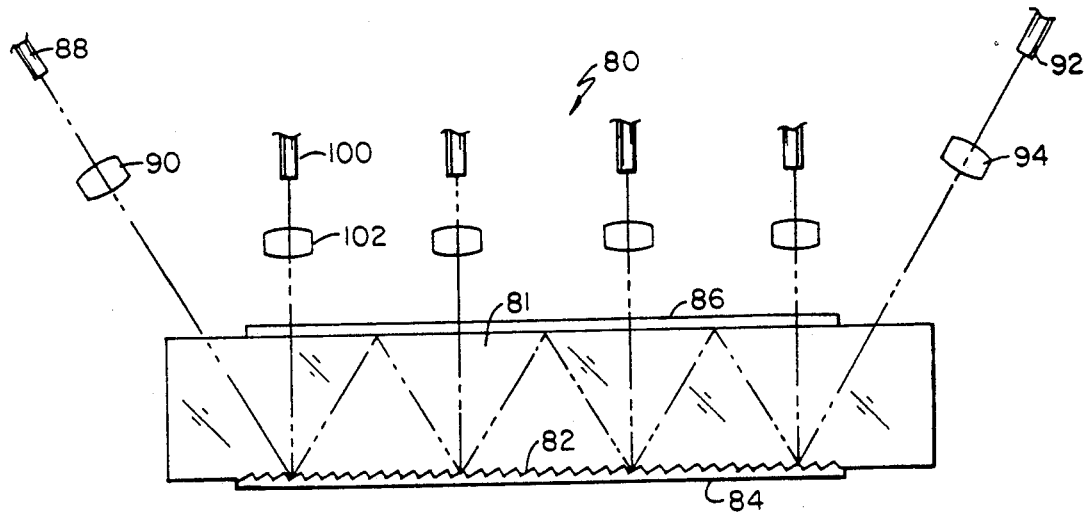
FIGS. 5a, 5b, and 5c are schematics of, respectively, top, front, and end views of another embodiment of the invention.
Figure 5B:
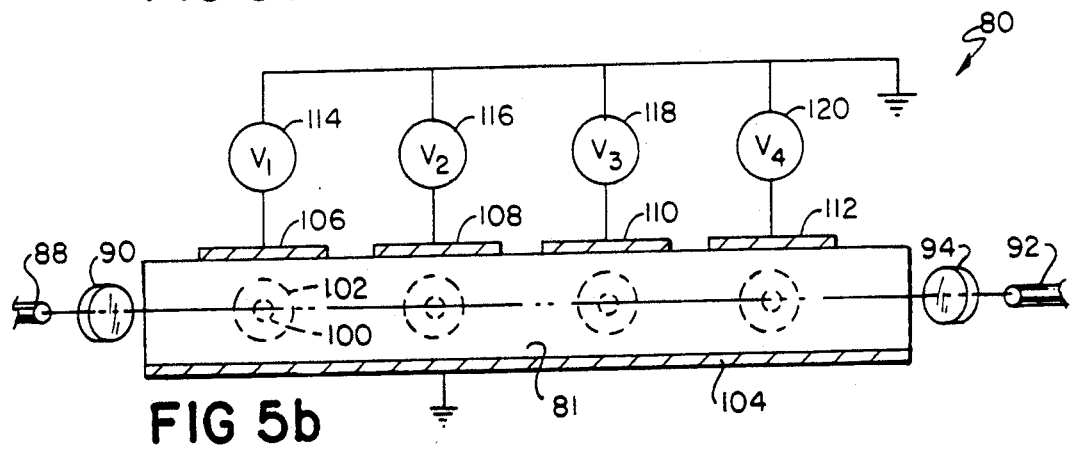
Figure 5C:
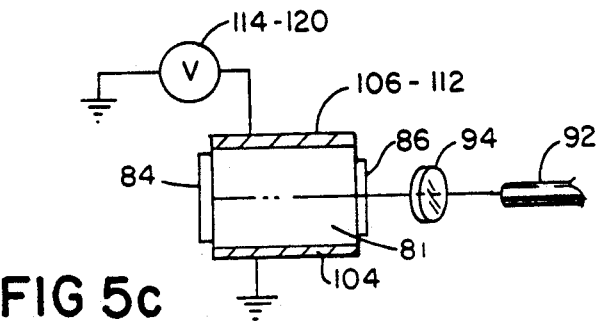

FIGS. 5a-c show a device 80 that is fabricated of an etalon made of lithium niobate or lithium tantalate. With device 80, the electric field is applied perpendicular to the trapped beam direction rather than in its direction. As shown, device 80 comprises a polished crystal 81 of lithium niobate or lithium tantalate having on one side a grating 82 backed by a 100% reflecting mirror 84. Facing mirror 84 is a 99% reflecting mirror 86 to allow a small percentage of selected light to pass through it.

The input trunk line is represented by optical fiber 88 whose output is collimated by lens 90 while being directed onto the surface of the grating 82. Output is by way of branch fiber 92 which receives its input by focusing lens' 94. Pickoff stations by which signals can be transferred from trunk to station and branch and vice versa are represented by typical fiber 100 and its associated lens 102.

As shown in FIGS. 5a and b, the front side of device 80 has a ground electrode 104 attached to it while the opposing side has a array of separated electrodes, 106-112, corresponding to the pickoff stations. Each electrode, 106-112, has associated with it a variable voltage source, 114-120, respectively, for tuning signals through the application of an electric field transverse to the direction of propagation of signal through the bulk material 81.

Those skilled in the art may make other embodiments without departing from the scope of the invention. For example, more closely spacing the reflecting surfaces of the etalon while at the same time widening the incoming beam so that its opposite edges overlap during successive reflections as it travels down the etalon, permits the output to exist as a wavelength continuum as in a spectrum analyzer rather than as discrete wavelengths which exist at regularly spaced locations. Also, it will be recognized that the devices are completely reservable in operation for either demultiplexing or multiplexing applications. Therefore, it is intended that all matter contained in the above description or shown in the accompanying drawings shall be interpreted as illustrative and not in a limiting sense.

What is claimed is:

1. An optical multiplexing/demultiplexing device comprising:

an etalon-like structure consisting of a pair of spaced apart, substantially parallel, highly reflective mirror surfaces at least one of which is partially transparent over a predetermined band of wavelengths;

a weak diffraction grating formed on one of said reflective mirror surfaces;

means for coupling a collimated optical beam, containing a plurality of signals of different wavelength within said predetermined band, into said etalon-like structure so that said optical beam travels from one end of said etalon-like structure to the other by being alternately reflected between said reflective mirror surfaces a multiple number of times and strikes said diffraction grating at a predetermined angle of incidence as it travels lengthwise along said etalon-like structure, said diffraction grating being structured so that, acting by itself, it diffracts a small percentage of said signals in said predetermined band perpendicular to said reflective mirror surfaces each time said optical beam is incident thereto at said predetermined angle of incidence; and means for locally controlling the optical path length between said reflective mirror surfaces at lengthwise locations along said etalon-like structure corresponding to those places where said signals have been diffracted perpendicular to said reflective surfaces to render said lengthwise locations resonant at one or more preselected wavelengths within said predetermined band of wavelengths, each of said selected wavelengths resonant between said reflective mirror surfaces reflecting therebetween a multiplicity of times with at least a part of the energy therein emerging from said lengthwise locations through said reflecting mirror surface which is partially transparent.

2. The device of claim 1 further including means for coupling the remainder of said beam out of the other end of said etalon for subsequent time.

3. The device of claim 1 wherein said highly reflective mirror surfaces are fabricated to be slightly non parallel to provide a controlled physical difference in path length at said lengthwise locations.

4. The device of claim 1 wherein said means for changing the optical path length between said reflective surfaces comprises means for differentially heating said etalon to change the spacing between said reflecting surfaces.

5. The device of claim 1 wherein said etalon comprises a piece of glass with polished surfaces and wherein said reflecting surfaces of said etalon are opposing polished surfaces of said glass that have been coated for reflection.

6. The device of claim 5 wherein one of said reflection surfaces is shorter than the other to provide clear end sections through which signals can be coupled in and out of said piece of glass.

7. The device of claim 5 wherein said glass is an electro-optic material capable of having its index of refraction changed to locally change the optical path length at said lengthwise locations of said etalon between said reflecting surfaces.

8. The device of claim 7 wherein said electro-optic material is selected from the group consisting of lithium niobate, lithium tantalate, ADP, and KDP.

9. The device of claim 7 wherein said means for changing the optical path length between said reflecting surfaces at said lengthwise locations of said etalon comprise means for locally applying electric fields thereto.

10. The device of claim 9 wherein said electric fields are applied in the direction in which said optical signals propagate through said etalon.

11. The device of claim 9 wherein said electric fields are applied perpendicular to the direction in which said signals propagate through said etalon.

12. The device of claim 1 wherein said grating is blazed.

13. The device of claim 1 wherein said means for coupling said optical signals into said etalon comprise an optical waveguide and a collimating lens which directs said signals onto a portion of one of said reflecting surfaces at a predetermined angle of incidence.

14. The device of claim 2 wherein said means for coupling signals out of said etalon comprise and optical waveguide and a lens for receiving remainder signals from said etalon and focusing them into the end of said waveguide.

15. The device of claim 5 wherein said means for changing the optical path length at said lengthwise locations comprises heaters at opposing ends of said etalon for applying a temperature gradient that varies in a predetermined way across the length of said etalon.

16. The device of claim 1 further including an array of photodetectors each of which is positioned along said lengthwise locations to receive a signal at a predetermined wavelength.

17. The device of claim 1 wherein the reflectivity of said reflection surfaces is on the order of 99% and the diffraction efficiency of said grating is 1%.

18. The device of claim 1 wherein said means for changing the optical path length between said reflective surfaces comprises at least one heating element mounted on one end of said etalon like structure for differentially heating it to controllably change the spacing between said reflecting surfaces.

19. The device of claim 1 wherein the spacing between said reflecting surfaces of said etalon like structure and the width of said collimated optical beam are such that the output emerging from its output side in the form of a wavelength continuum.

20. The device of claim 1 further including means for coupling out the remainder of said collimated input beam for further use after portions of it have been removed and demultiplexed by said device.

21. The device of claim 1 further including means for coupling individual signals of predetermined wavelength into said localized resonant lengthwise locations of said device so that said device can be used for multiplexing purposes.

22. The device of claim 21 further including means for coupling collimated light into or out of it at a second location at a predetermined angle of incidence so that said device is completely reservable in operation as either a multiplexer or demultiplexer.

* * * * *